(12) United States Patent
Gobinath et al.

(10) Patent No.: US 10,093,136 B2
(45) Date of Patent: Oct. 9, 2018

(54) AIR MAINTENANCE TIRE PUMPING TUBE COVER STRIP

(71) Applicant: The Goodyear Tire & Rubber Company, Akron, OH (US)

(72) Inventors: Thulasiram Gobinath, Hudson, OH (US); Patrick David Marks, Uniontown, OH (US); Arun Kumar Byatarayanapura Gopala, Copley, OH (US); Jungmee Kang, Macedonia, OH (US); Robin Lamgaday, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 397 days.

(21) Appl. No.: 14/927,683

(22) Filed: Oct. 30, 2015

(65) Prior Publication Data
US 2017/0120699 A1    May 4, 2017

(51) Int. Cl.
| | |
|---|---|
| *B60C 29/04* | (2006.01) |
| *B60C 23/10* | (2006.01) |
| *B60C 23/12* | (2006.01) |
| *B60C 23/00* | (2006.01) |
| *B60C 11/00* | (2006.01) |

(Continued)

(52) U.S. Cl.
CPC ............ *B60C 23/004* (2013.01); *B60C 11/00* (2013.01); *B60C 13/02* (2013.01); *B60C 15/00* (2013.01); *B60C 23/12* (2013.01); *B60C 29/04* (2013.01); *B60B 21/04* (2013.01)

(58) Field of Classification Search
CPC ......... B60C 23/00; B60C 23/10; B60C 23/12; B60C 29/00; B60C 29/04; B60C 29/06
See application file for complete search history.

(56) References Cited

U.S. PATENT DOCUMENTS

| | | | |
|---|---|---|---|
| 638,628 A | 12/1899 | Everett et al. | |
| 1,050,886 A | 1/1913 | Wetherell | |

(Continued)

FOREIGN PATENT DOCUMENTS

| | | |
|---|---|---|
| DE | 34433318 | 3/1986 |
| EP | 2455239 A1 | 5/2012 |

(Continued)

OTHER PUBLICATIONS

EPO Search Report received by Applicant on Mar. 23, 2017.
Chinese search report dated Mar. 21, 2018 and received by Applicant on Mar. 28, 2018.

*Primary Examiner* — Justin R Fischer
(74) *Attorney, Agent, or Firm* — Edward T. Kennedy

(57) ABSTRACT

An air maintenance tire assembly is provided in which an elongate groove is located within a first sidewall of a tire. The groove forms an elongate channel within the first sidewall and an elongate groove access passage extends from the elongate channel to an access opening located at an outward surface of the first sidewall. An air pumping tube inserts through the groove access passage and is positioned within the groove channel. A cover strip attaches to the first sidewall to enclose the access opening of the groove access passage. The cover strip is positioned along the first sidewall at a higher distance from the bead region of the first sidewall than the groove channel to avoid contact with a wheel rim flange when the tire is mounted to a wheel rim.

17 Claims, 3 Drawing Sheets

(51) Int. Cl.
  *B60C 13/02* (2006.01)
  *B60C 15/00* (2006.01)
  *B60B 21/04* (2006.01)

(56) References Cited

U.S. PATENT DOCUMENTS

| | | |
|---|---|---|
| 1,134,361 A | 4/1915 | Wetherell |
| 1,682,992 A | 9/1928 | McKone |
| 3,304,981 A | 2/1967 | Sheppard |
| 3,833,041 A | 9/1974 | Glad et al. |
| 4,922,984 A | 5/1990 | Dosjoub et al. |
| 5,052,456 A | 10/1991 | Dosjoub |
| 7,117,731 B2 | 10/2006 | Hrabal |
| 7,225,845 B2 | 6/2007 | Ellmann |
| 8,113,254 B2 | 2/2012 | Benedict |
| 8,826,955 B2 | 9/2014 | Delgado et al. |
| 8,857,484 B2 | 10/2014 | Hinque |
| 8,944,126 B2 | 2/2015 | Frantzen |
| 8,991,456 B2 | 3/2015 | Gobinath |
| 9,259,975 B2 | 2/2016 | Welter et al. |
| 2009/0294006 A1 | 12/2009 | Hrabal |
| 2012/0125504 A1* | 5/2012 | Delgado ................ B60C 23/12 152/429 |
| 2014/0000778 A1 | 1/2014 | Gobinath |
| 2014/0020805 A1 | 1/2014 | Gobinath et al. |
| 2014/0109405 A1 | 4/2014 | Benedict et al. |
| 2014/0261943 A1 | 9/2014 | Welter et al. |
| 2014/0360643 A1 | 12/2014 | Collette et al. |
| 2015/0041036 A1 | 2/2015 | Lin |
| 2015/0059952 A1 | 3/2015 | Benedict et al. |
| 2015/0090386 A1 | 4/2015 | Lin et al. |
| 2015/0122387 A1 | 5/2015 | Gobinath |
| 2015/0122388 A1 | 5/2015 | Durr |
| 2015/0122389 A1 | 5/2015 | Durr |
| 2015/0122390 A1 | 5/2015 | Durr |
| 2015/0165842 A1 | 6/2015 | Welter et al. |
| 2015/0165843 A1 | 6/2015 | Welter et al. |

FOREIGN PATENT DOCUMENTS

| | | |
|---|---|---|
| EP | 2567834 A2 | 3/2013 |
| EP | 2777959 A1 | 9/2014 |
| EP | 2842775 A1 | 3/2015 |
| RU | 2106978 | 3/1998 |
| SE | 183890 | 5/1963 |
| WO | WO2003049958 | 6/2003 |
| WO | WO2005012009 A1 | 7/2004 |
| WO | 2007134556 | 11/2007 |
| WO | WO2010008338 A1 | 1/2010 |

* cited by examiner

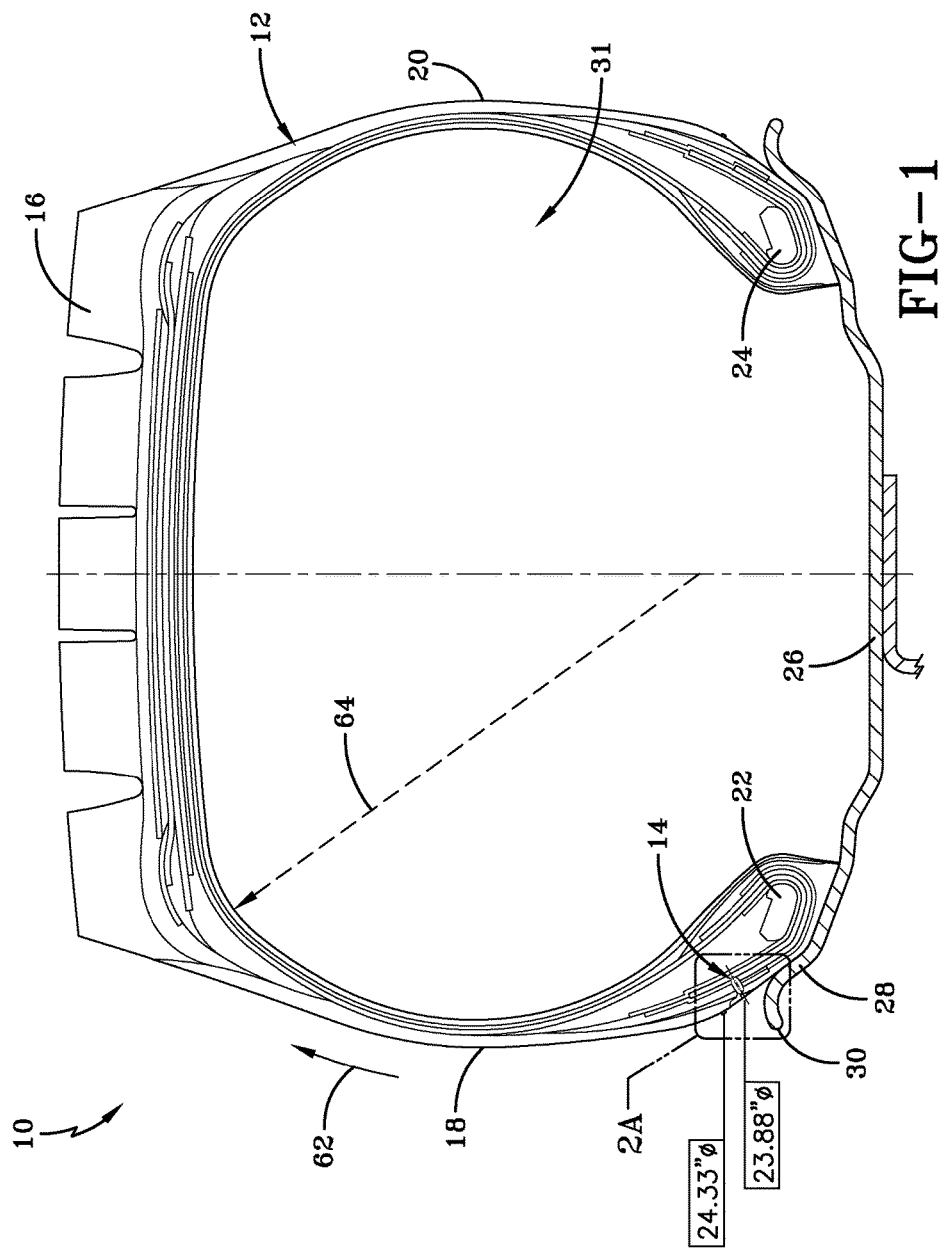

AIR MAINTENANCE TIRE PUMPING TUBE COVER STRIP

STATEMENT OF FEDERAL FUNDING

The invention was made with government support under DE-EE0005447 awarded by the Department of Energy. The government has certain rights in the invention.

FIELD OF THE INVENTION

The invention relates generally to air maintenance tires and, more specifically, to a tire assembly incorporating an air pumping mechanism into a tire for maintaining tire air pressure.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire pressure monitoring systems have been proposed to warn drivers when tire pressure is significantly low. Such systems, however, remain dependant upon the driver taking remedial action when warned to re-inflate a tire to recommended pressure. It is a desirable, therefore, to incorporate an air maintenance feature within a tire that will self-maintain the tire air pressure in order to compensate for any reduction in tire pressure over time without a need for driver intervention.

SUMMARY OF THE INVENTION

According to an aspect of the invention, an air maintenance tire assembly is provided in which an elongate groove is located within a sidewall of a tire. The groove forms an elongate channel within the first sidewall and an elongate groove access passage extends from the elongate channel to an access opening located at an outward surface of the first sidewall. An air pumping tube inserts through the groove access passage and is positioned within the groove channel. A cover strip attaches to the sidewall to enclose the access opening of the groove access passage. The cover strip is positioned along the first sidewall at a radially higher distance from the bead region of the first sidewall than the groove channel to avoid contact between the cover strip and a wheel rim flange when the tire is mounted to a wheel rim.

Pursuant to a further aspect, the groove access passage angles upward to position the access opening to the groove channel farther away from the bead region of the first sidewall than the groove channel.

In still a further aspect, the groove access passage is formed having a substantially funnel-shape including a wider mouth at the access opening and a narrower neck connecting to the groove channel. The cover strip has a complimentary funnel-shape in cross-section fitting closely within the groove access passage.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 1 is a cross-section view of tire and pump assembly.

DETAILED DESCRIPTION OF THE INVENTION

Figure 2A:
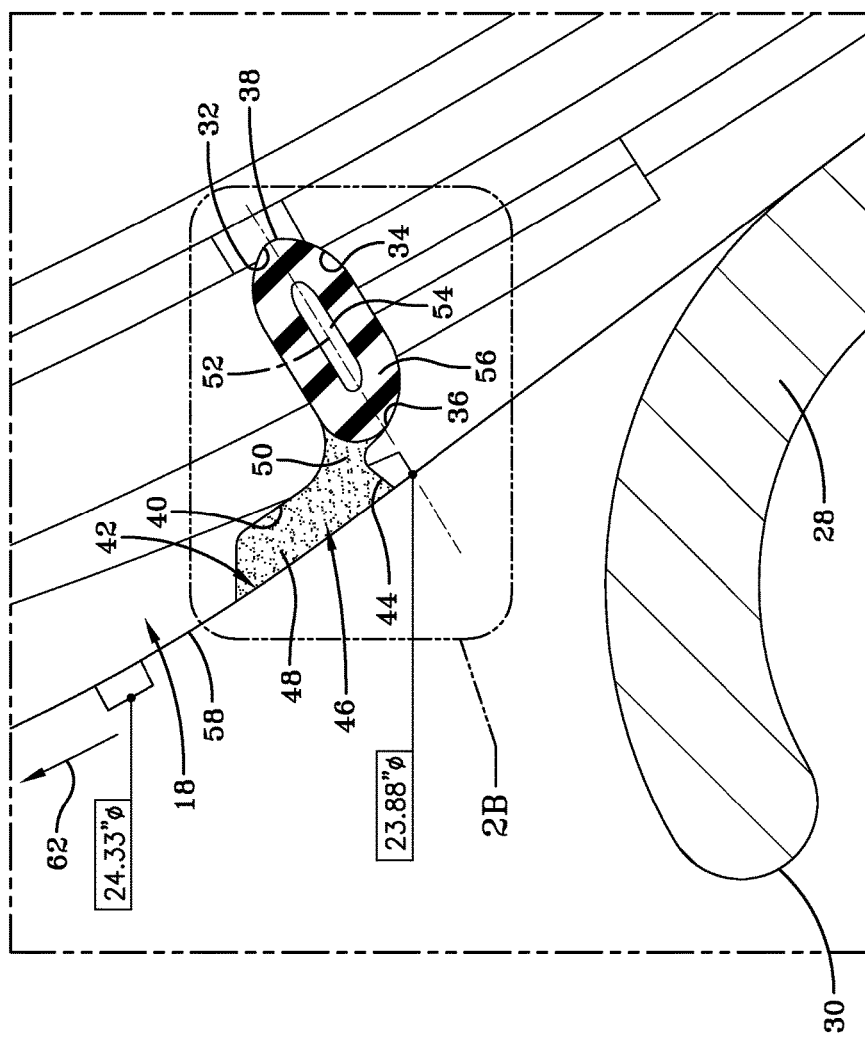
FIG. 2A is an enlarged sectional view of the pumping tube location within the tire showing the new cover strip configuration and location relative to the pumping tube channel and to the wheel rim flange.

Referring to FIGS. 1 and 2, a tire assembly 10 includes a tire 12, a peristaltic pump assembly 14 and a tire wheel rim 26. The tire mounts in conventional fashion to the wheel rim 26. The wheel rim 26 has a rim flange 28 terminating at an upper boundary edge 30. The tire is of conventional construction, having a pair of sidewalls 18, 20 extending from opposite bead areas 22, 24 to a crown or tire read region 16. The tire 12 and wheel rim 26 enclose a tire cavity 31.

As shown in FIGS. 1, 2 and 3, the pump assembly 14 includes an air tube 56 mounted in a passageway or a groove channel 34 of groove 32 and air inlet and air outlet devices that admit air into the tube and direct pressurized air from the tube (not shown). Groove 32 is formed within a sidewall 18, or both sidewalls 18, 20 if desired. Groove 32 may be formed conventionally by molding the groove into the sidewall during tire build operation. The tube 56 is formed of a resilient, flexible material such as plastic or rubber compounds that are capable of withstanding repeated deformation cycles. So constructed, the tube may deform within a tire into a flattened condition subject to external force and, upon removal of such force, return to an original sectional configuration. In the embodiment shown, the cross-section of the tube 56 in an unstressed state is generally circular with an inner air passageway 52 extending along a center axis of the tube 56. The tube is of a diameter sufficient to operatively pass a requisite volume of air sufficient for the purpose of pumping air into the tire cavity 31 to maintain the tire 12 at a preferred inflation pressure. While the air tube 56 shown in this embodiment is preferably annular for a 360 degree pump, the air tube need not be annular and may have any sufficient length for example, a 180 degree pump.

An elongate groove 32 has a groove channel 34 of complementary shape to the tube 56. The groove 32 is further formed having a funnel-shaped groove access passageway 40 extending to an axially outward surface 58 of a sidewall such as sidewall 18. The groove channel 34 is preferably in the geometric form of an annular ring and elliptical in section, complimentary to the cross-section of tube 56. The other sidewall may be grooved or both sidewalls if so desired. The groove has an internal sectional profile complementary with the external geometry of the tube 56 that accommodates close receipt of the tube 56. Operation of a peristaltic pump of the general type shown is disclosed in detail in U.S. Pat. No. 8,042,586, issued Oct. 25, 2011 entitled SELF-INFLATING TIRE ASSEMBLY, incorporated herein in its entirety by reference.

As the tire rotates, the sidewall 18 of the tire undergoes compression as it enters the tire footprint. A compressive force is directed into the tire from the footprint and acts to flatten a portion of the air tube passageway 54. As the tire continues to rotate, the pump tube 56 will be sequentially flattened or squeezed opposite the tire footprint in a segment-by-segment manner in a direction opposite to the direction of tire rotation. The sequential flattening of the tube passageway 54 segment-by-segment causes evacuated air from the flattened segments to be pumped to an outlet (not shown) and then to the tire cavity 31.

Figure 2B:
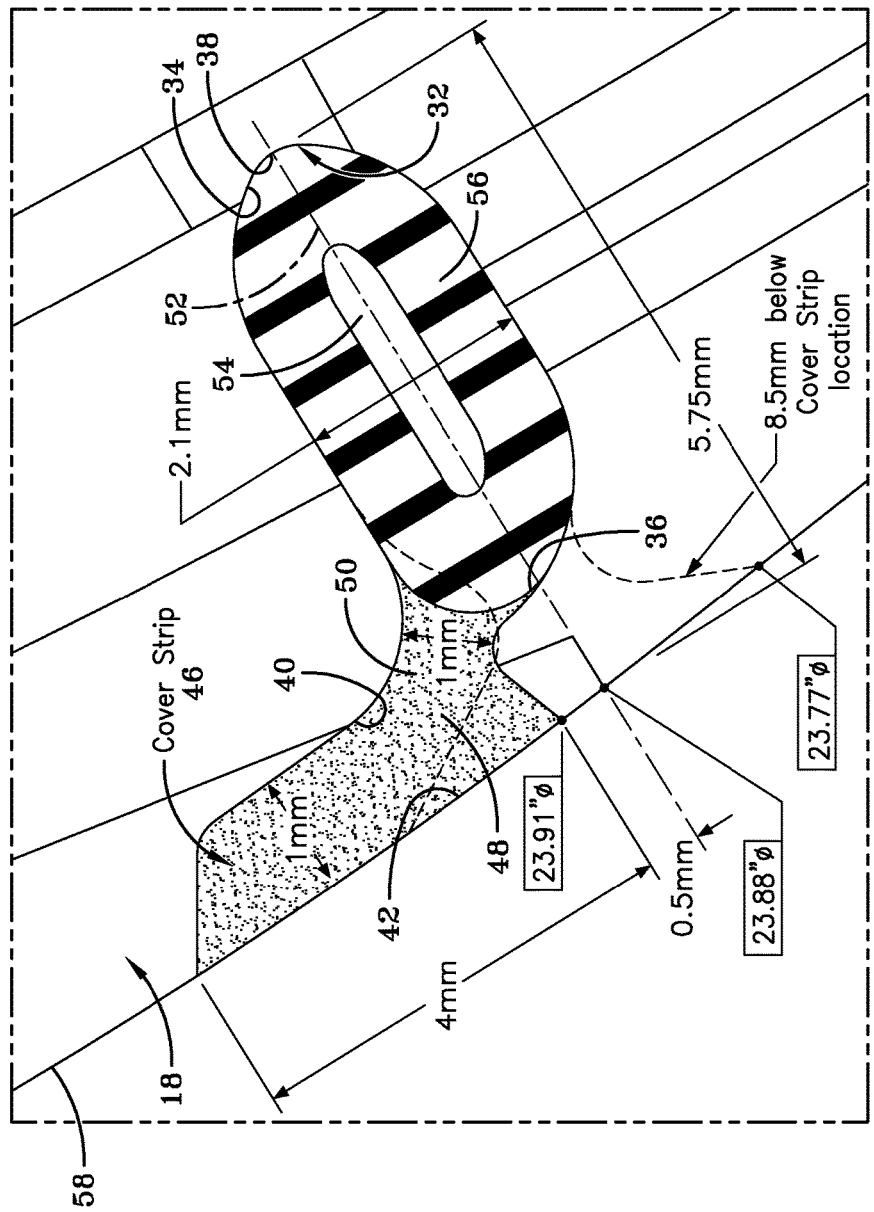
FIG. 2B is an enlarged sectional view of the pumping tube location and showing dimensionally the pumping tube and cover strip configuration and dimension.

It will be appreciated from FIG. 1 and FIG. 2B that the rim 26 has a flange 28 that seats the tire bead region when the tire mounts to the rim. The rim flange 28 has an upper edge 30 that is generally positioned below the sidewall location of the pumping tube 56. The tube 56 is thus placed in a high flex region of the sidewall 18 and intentionally located at a radial position up the sidewall 18 so that it is above the rim flange boundary formed by edge 30. Adequate flexing of the sidewall in the tube location is thus preserved to ensure the desired segment-by-segment collapse of tube 56.

With reference to FIG. 2A, the groove 32 configuration and orientation will now be explained. The groove 32 forms the groove channel 34 that extends in an annular path around the lower region of sidewall 18. The channel 34 is elliptical generally in cross-section forming a forward nose portion 36 oriented generally directed toward an outer surface 58 of the sidewall 18 and a rearward end 38 oriented generally directed away from the surface 58. The channel 34 is in the general form of an ellipse dimensioned for close receipt of the pumping tube 56. The groove 32 is preferably molded into the sidewall 18 by conventional means during tire construction with the tube 56 inserted into the channel 34 in a post cure procedure.

To assist in the post cure insertion of the tube 56 into the groove channel 34, the groove 32 is formed having an annular access passageway 40 that extends from an outward surface 58 of the sidewall 18 into the tire sidewall and to the groove channel 34. The access passageway is generally funnel-shaped in cross-section having an enlarged diameter (in section) access opening 42 at surface 58 tapering inward to a passageway neck region 44 that intersects and communicates with the forward nose 36 of the groove channel 34 as seen in FIGS. 2A and 2B. The funnel-shape allows the tube 56 to be inserted into the groove channel 34 where the tube 56 is substantially surrounded by sidewalls defining the channel 34.

It will be seen that the funnel-shaped (in section) form of the access passageway inclines from the groove channel 34 so that the access opening 42 of the access passageway 40 is located radially above a seated centerline 52 of the elliptical tube 56. For the purpose of explanation, the "radial" direction is defined as seen at 64 of FIG. 1 to mean a line drawn from the center of the tire to a point on the perimeter of the tire surface. Also shown in FIG. 1 by directional arrow 62 is the sidewall extension from the bead 22 "up" along the surface of the sidewall. Thus, the location of the access opening 42 of the access passageway 40 may be seen to be located radially "above" or "up from" the centerline 52 of tube 56 along the sidewall 18.

Referring to FIGS. 1, 2A and 2B, a cover strip 46 of compatible material composition as the sidewall 18 is fitted into the entry passageway 40 after the tube 56 has been seated within the groove channel 54. The cover strip is secured in place by curing or adhesive application and serves to enclose the tube in position. Like the access passageway 40, the cover strip is generally annular and funnel-shape in cross-section, having an enlarged strip band 48 at the outer side adjacent to the outer surface 58 of sidewall 18, and tapering inward through a strip neck band 50 to the groove channel 34. The cover strip 46 follows the same incline as the entry passageway 40 from the groove channel 34 to the sidewall surface 58 such that the cover strip enlarged portion 48 at the surface 58 is at a higher radial position than the tube 56. More specifically, the cover strip 46 is located above the tube center line 52 along the sidewall 18 farther away from the rim flange 28 and the rim flange boundary surface 30 as seen in FIG. 2A. The cover strip 46 extends from the surface 58 to the centerline 52 of the tube 56 creating an offset between the cover strip and the groove channel 34.

The purpose for the radial offset between the cover strip 46 and the tube/groove channel location within the sidewall 18 will be appreciated from FIG. 2A. It is important that the cover strip 46 remain attached and in place within the entry passageway 40 to keep the tube 56 enclosed throughout the life cycle of the tire. Separation of the cover strip 46 from its intended location within the passageway 40 would open the passageway 40 to invasion by external agents that could affect the pumping operation of the tube. Thus, it is important to protect the attachment of the cover strip 46 from passageway 40 in order to deter contact that would cause an undesirable separation.

Locating the strip 46 in line and at the same location as the groove channel 34 would place the external surface of the cover strip 46 at the sidewall surface 58 in close proximity with the rim flange 28. While under normal loading and inflation conditions a close proximity between the cover strip and rim flange would be acceptable, certain conditions may arise that would place the cover strip 46 into contact with the rim flange 28. An underinflated tire, for example, or an over load situation, could drop the cover strip down and into engagement with the rim flange. Such contact could impact the integrity of the cover strip attachment.

The radially superior location of the cover strip to the groove channel 34 thus serves to further distance the cover strip from the rim flange 28. In so doing, the cover strip 46 is distanced from the sidewall bead 22 a greater distance than the distance of the tube 56 from the bead 22. The distancing of the cover strip from the wheel rim flange is thus commensurate with the distancing of the cover strip in the radial direction from the bead 22. Accordingly, reference to the bead region distance may be made when the tire is unmounted to wheel rim and serves to accomplish the same information. That is, offsetting the cover strip to increase strip separation from the bead region 22 of an unmounted tire means the same as offsetting the cover strip to increase strip separation from the wheel rim flange when the tire is mounted to a wheel rim.

Increasing the distance of the cover strip from the bead region (or the wheel rim in a mounted tire) provides a margin of safety that will avoid contact between the strip and the rim flange even when the tire is underinflated or overloaded. The radial incline of the access passageway 40 and the cover strip 46 from the groove channel to the outer surface 58 of the sidewall 18 increases the distance of separation of the cover strip at the surface 58 from the rim flange 28 and thus reduces the risk of chaffing between the strip and the rim.

The dimensions of the tube 56, the cover strip 46, and the access passageway 40 are given in FIG. 2B. While the dimensions shown provide relational information between the components, the invention is not intended to be so limited and dimensional variations may be incorporated without departing from the invention. The radial offset between the cover strip location along sidewall 18 and the groove channel 34 is shown to effectively place the cover strip at the sidewall surface 58 in a higher, more distal relationship with the rim 28.

The rim flange has a specified flange height tolerance specification range. It may be concluded that for normal inflation and rated load condition, the cover strip deformation is predicted to interfere when the rim flange height is in the top end of the flange height tolerance. In the under inflated and over loaded conditions, the cover strip deformation at the pumping tube height would interfere with the rim flange for mid to low end of the flange height tolerance specification. Moving the groove channel 34 up could eliminate the problem but may impact low load pumping performance. The subject invention keeps the groove channel 34 at the same (optimal) location but moves the cover strip up to avoid detrimental cover strip interference with the rim flange.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An air maintenance tire assembly comprising:
   a tire including first and second sidewalls extending respectively from lower sidewall ends connected to respective first and second tire bead regions to higher sidewall ends that are connected to a tire tread region, and defining a cavity;
   an elongate groove located within the first sidewall of the tire, the groove comprising an elongate channel within the first sidewall and an elongate groove access passage extending at an incline from the elongate channel to an access opening located at an outward surface of the first sidewall;
   a tube positioned within the groove elongate channel; and
   a cover strip attached to and extending annularly about the first sidewall and enclosing the access opening of the groove access passage, wherein the cover strip and the access opening are positioned at the outward surface of the first sidewall at a higher radial location on the first sidewall than the groove elongate channel location within the first sidewall.

2. The tire assembly of claim 1, wherein the groove access passage is substantially funnel-shaped in cross-section comprising a wider mouth at the outward surface of the first sidewall and a narrower neck connecting to the groove channel.

3. The tire assembly of claim 2, wherein the cover strip has a complimentary substantially funnel-shape in cross-section dimensioned to closely fit within the funnel-shaped groove access passage.

4. The tire assembly of claim 1, wherein the groove channel is generally elliptical in cross-section along longitudinal axis, and the groove channel comprises a forward nose end oriented toward the outward surface of the first sidewall and a channel inward nose end oriented away from the outward surface of the first sidewall, and wherein the groove access passage of the groove connects to the groove channel substantially along the channel forward nose end.

5. The tire assembly of claim 4, wherein the groove access passage is substantially funnel-shaped in cross-section comprising a wider mouth at the outward surface of the first sidewall and a narrower neck connecting to the groove channel; and
   wherein the cover strip has a complimentary substantially funnel-shape in cross-section, the funnel shape dimensioned to closely fit within the funnel-shaped groove access passage.

6. The tire assembly of claim 5, wherein the narrower neck of the groove access passage connect to the forward nose end of the groove channel substantially from a longitudinal side of the groove channel to the longitudinal axis of the groove channel.

7. The tire assembly of claim 6, wherein the narrower neck connecting to the groove channel has a nominal width of approximately 1 mm.

8. The tire assembly of claim 5, wherein the wider mouth of the groove access passage at the outward surface of the first sidewall has a lower boundary offset along the outward surface of the first sidewall from the longitudinal axis of the groove channel.

9. The tire assembly of claim 8, wherein the offset of the wider mouth of the groove access passage along the outward surface of the first sidewall is in a range from about 0.5 mm to 1.5 mm.

10. The tire assembly of claim 1, wherein the groove channel is spaced a distance within the tire sidewall from the outward surface of the sidewall.

11. The tire assembly of claim 10, wherein the tube is annular.

12. The tire assembly of claim 1, wherein the tire is mounted to a wheel rim having a rim flange abutting the bead region of the first sidewall and wherein the tire groove channel is annular and located proximally above an upper boundary of the rim.

13. The tire assembly of claim 12 wherein the tube cross-sectional shape is generally elliptical when mounted in the groove channel in a tire unloaded state.

14. The tire assembly of claim 12, wherein the cover strip is spaced along the first sidewall a distance from the upper boundary of the rim greater than the annular groove channel.

15. An air maintenance tire assembly comprising:
- a tire including first and second sidewalls extending respectively from lower sidewall ends connected to respective first and second tire bead regions to higher sidewall ends that are connected to a tire tread region, and defining a tire cavity;
- an elongate groove located within the first sidewall of the tire, the groove comprising an elongate channel within the first sidewall and an elongate groove access passage extending from the elongate channel to an access opening located at an outward surface of the first sidewall;
- a tube positioned within the groove elongate channel; and
- a cover strip attached to and extending annularly about the first sidewall and enclosing the access opening of the groove access passage, wherein the cover strip is positioned along the first sidewall a distance from the first bead region greater than the groove channel.

16. The air maintenance tire assembly according to claim 15, wherein the access opening to the groove channel is positioned at the outward surface of the first sidewall at a higher radial location on the first sidewall from the first bead region than the groove channel.

17. The air maintenance tire assembly according to claim 16, wherein the groove access passage is substantially funnel-shape having a wider mouth at the access opening and a narrower neck connecting to the groove channel; and
  wherein the cover strip has a complimentary substantially funnel-shape in cross-section fitting closely within the groove access passage.

* * * * *